US009437368B2

(12) United States Patent
Mori et al.

(10) Patent No.: US 9,437,368 B2
(45) Date of Patent: Sep. 6, 2016

(54) CAPACITOR AND METHOD FOR MANUFACTURING SAME

(71) Applicant: NIPPON CHEMI-CON CORPORATION, Tokyo (JP)

(72) Inventors: Masayuki Mori, Tokyo (JP); Ikufumi Honda, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 139 days.

(21) Appl. No.: 14/269,309

(22) Filed: May 5, 2014

(65) Prior Publication Data

US 2014/0240900 A1    Aug. 28, 2014

Related U.S. Application Data

(63) Continuation of application No. PCT/JP2012/007353, filed on Nov. 16, 2012.

(30) Foreign Application Priority Data

Nov. 17, 2011  (JP) .................................. 2011-251667

(51) Int. Cl.
  *H01G 9/12*  (2006.01)
  *H01G 9/10*  (2006.01)
  *H01G 9/08*  (2006.01)

(52) U.S. Cl.
  CPC .................. *H01G 9/12* (2013.01); *H01G 9/08* (2013.01); *H01G 9/10* (2013.01); *Y02E 60/13* (2013.01); *Y10T 29/43* (2015.01)

(58) Field of Classification Search
  CPC ................................ H01G 9/12; H01G 11/18

USPC ........................................ 361/520–521, 25.03
See application file for complete search history.

(56) References Cited

U.S. PATENT DOCUMENTS

| 2,500,632 | A | * | 3/1950 | Drake | ...................... | H01G 9/12 |
| | | | | | | 174/11 R |
| 3,398,026 | A | | 8/1968 | Andre | | |
| 4,992,910 | A | * | 2/1991 | Evans | ...................... | H01G 9/08 |
| | | | | | | 361/502 |
| 7,706,127 | B2 | * | 4/2010 | Miura | ...................... | H01G 9/10 |
| | | | | | | 361/502 |
| 7,916,454 | B2 | * | 3/2011 | Shimizu | .................. | H01G 9/12 |
| | | | | | | 361/519 |

(Continued)

FOREIGN PATENT DOCUMENTS

| CN | 101714465 A | 5/2010 |
| JP | 33-2177 Y1 | 2/1958 |
| JP | 35-3435 Y1 | 2/1960 |

(Continued)

OTHER PUBLICATIONS

International Search Report, dated Feb. 19, 2013, issued in corresponding application No. PCT/JP2012/007353.

(Continued)

*Primary Examiner* — Eric Thomas
(74) *Attorney, Agent, or Firm* — Westerman, Hattori, Daniels & Adrian, LLP

(57) ABSTRACT

A capacitor includes a sealing member that includes a valve installation part, the valve installation part being higher than a processed sealing part of an outer packaging case for housing a capacitor element; and a pressure valve that is installed in a through hole of the valve installation part and whose valve function part is set at a position, the position being higher than the processed sealing part.

3 Claims, 6 Drawing Sheets

(56) References Cited

U.S. PATENT DOCUMENTS 8,130,487 B2 * 3/2012 Shimizu .................. H01G 9/08
361/512
2010/0079927 A1 4/2010 Shimizu et al.

FOREIGN PATENT DOCUMENTS

| JP | 49-80333 | | 7/1974 |
|---|---|---|---|
| JP | 55-20247 | | 2/1980 |
| JP | 03-110827 U | | 11/1991 |
| JP | 05291092 A | * | 11/1993 |
| JP | 2000-228180 A | | 8/2000 |
| JP | 2005-116955 A | | 4/2005 |
| JP | 2006-294669 A | | 10/2006 |
| KR | 2009-0085210 A | | 8/2009 |

OTHER PUBLICATIONS

Written Opinion, dated Feb. 19, 2013, issued in corresponding application No. PCT/JP2012/007353.

Extended European Search Report dated Sep. 8, 2015, issued in counterpart Application No. 12850143.4 (7 pages).

Notification of Transmittal of Translation of the International Preliminary Report on Patentability (Form PCT/IB/338) of International Application No. PCT/JP2012/007353, mailing dated of May 30, 2014, with Forms PCT/IB/373 and PCT/ISA/237.

Office Action dated Mar. 3, 2016, issued in counterpart Chinese Patent Application No. 201280055454.8, with English translation. (13 pages).

* cited by examiner

CAPACITOR AND METHOD FOR MANUFACTURING SAME

CROSS-REFERENCE TO RELATED APPLICATIONS

This application is a continuation of International Application No. PCT/JP2012/007353, filed on Nov. 16, 2012, which is entitled to the benefit of priority of Japanese Patent Application No. 2011-251667, filed on Nov. 17, 2011, the contents of which are hereby incorporated by reference.

BACKGROUND OF THE INVENTION i) Field of the Invention

The present invention relates to capacitors such as electric double layer capacitors and electrolytic capacitors each of which is provided with a pressure valve for emitting gas in an outer packaging case, and to methods for manufacturing the same.

ii) Description of the Related Art

A pressure valve for emitting gas in an outer packaging case is provided for a capacitor such as an electric double layer capacitor and an electrolytic capacitor. This pressure valve has a gas emission function and an explosion-proof function. A thin film is provided for a pressure valve in order to fulfill these functions. Generated gas in a capacitor is gradually emitted through this thin film. This is the gas emission function. In contrast, gas that is suddenly generated by anomalies in a capacitor extraordinarily increases the internal pressure in the case because the generated gas is beyond the gas emission function. In this case, the pressure of the gas bursts the thin film of the pressure valve; that is, opening of the pressure valve allows the gas to be instantly emitted into the outside. Thereby, the explosion-proof function is fulfilled.

Concerning a capacitor including such a pressure valve, Japanese Unexamined Utility Model Application Publication No. H03-110827 describes that a safety valve is attached to a cover of a case that houses a capacitor element, this safety valve is provided with an overhanging in the thickness of the cover, and the tip of this overhanging is matched with the surface of the cover.

BRIEF SUMMARY OF THE INVENTION

Drops of water and dust threaten to adhere to any capacitor in a device that is affected by the outside air, such as in-vehicle equipment. The adhesion of dust and drops of water to a valve function part of a pressure valve damages the gas emission function and the explosion-proof function. It is always necessary for a valve function part of a pressure valve to be kept clean because the deterioration in any function of a pressure valve deteriorates the safety. For cleaning a valve function part, dust and drops of water need to be removed. However, it is ideal but not practical to do maintenance of capacitors equipped with devices, including removal of dust and drops of water, as needed.

There is a problem that the function part of the safety valve (pressure valve) described in Japanese Unexamined Utility Model Application Publication No. H03-110827 cannot avoid the adhesion of dust and drops of water and dust and drops of water remain because being matched with the outer surface of the cover (sealing plate).

Leaving dust and moisture adhering threatens to deteriorate any valve function and a valve function part. Dust and moisture remaining in a valve function part are also the cause of the deterioration of any valve function, and further, of a valve function part. There is a problem that proper operation cannot be obtained from a pressure valve if a valve function deteriorates.

It is therefore an object of the capacitor of the present invention and the method for manufacturing the same to prevent any function of a pressure valve from deteriorating in view of the above problems.

According to an aspect of the capacitor of the present invention, the capacitor includes a sealing member that includes a valve installation part, the valve installation part being higher than a processed sealing part of an outer packaging case for housing a capacitor element; and a pressure valve that is installed in a through hole of the valve installation part and whose valve function part is set at a position, the position being higher than the processed sealing part.

According to an aspect of the method for manufacturing a capacitor of the present invention, the method includes forming a valve installation part that is higher than a processed sealing part of an outer packaging case for housing a capacitor element, the processed sealing part sealing the outer packaging case; and setting a valve function part of a pressure valve that is installed in a through hole opened in the valve installation part at a position, the position being higher than the processed sealing part.

Additional objects and advantages of the present invention will be apparent from the following detailed description of preferred embodiments thereof, which are best understood with reference to the accompanying drawings.

DETAILED DESCRIPTION OF THE INVENTION

One Embodiment

Figure 1:
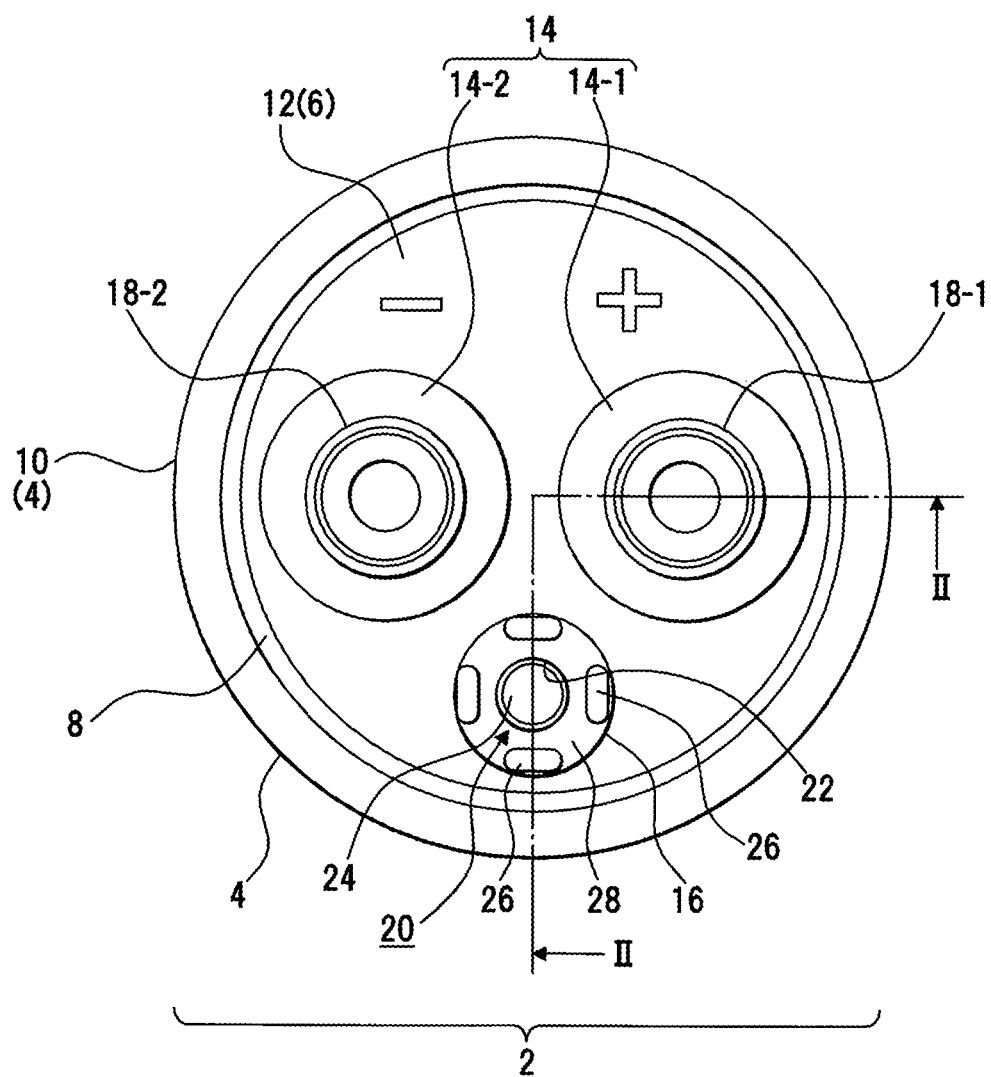
FIG. 1 is a plan view depicting a capacitor according to one embodiment.

FIG. 1 depicts a capacitor according to one embodiment of the present invention. The capacitor depicted in FIG. 1 is an example of the capacitor of the present invention, and the present invention is not limited to such a structure.

This capacitor 2 may be any capacitor that generates gas when operating, such as an electric double layer capacitor or an electrolytic capacitor. The opening of an outer packaging case 4 of this capacitor 2 is sealed by a sealing plate 6. This sealing plate 6 is an example of a sealing member that seals the opening of the outer packaging case 4. The outer packaging case 4 is a formed object of aluminum, for example. The sealing plate 6 may be a member that seals such an outer packaging case 4, and is constituted by rubber, synthetic resin, etc. The sealing plate 6, which is an example, is a molded object of hard synthetic resin. Since the opening of the outer packaging case 4 is a round shape, the sealing plate 6 is also formed into a round shape so as to match this opening.

A sealing ring 8 is installed along a peripheral edge part of the sealing plate 6. A curling part 10 is formed along the opening edge of the outer packaging case 4. This curling part 10 is an example of a processed sealing part of the outer packaging case 4. The outer packaging case 4 is sealed with the sealing plate 6, the sealing ring 8 and the curling part 10 of the outer packaging case 4.

An exposed surface 12 of the sealing plate 6 is surrounded by the curling part 10. Islands 14 and 16 are formed on this exposed surface 12. The island 14 is an example of a terminal installation part. The island 16 is an example of a valve installation part. An anode terminal 18-1 and a cathode terminal 18-2 are installed in the island 14. A pressure valve 20 is installed in the island 16.

The island 14 includes circular areas that make circuits separately around the anode terminal 18-1 and the cathode terminal 18-2. That is, the island 14 includes an island 14-1 and an island 14-2; the island 14-1 includes a circular area that makes a circuit around the anode terminal 18-1; and the island 14-2 includes a circular area that makes a circuit around the cathode terminal 18-2. The island 14 is symmetrical.

In contrast to this island 14, the island 16 is formed on a position on the center line between the anode terminal 18-1 and the cathode terminal 18-2. A through hole 22 is formed in the center of this island 16. This through hole 22 is a circular hole that penetrates through the sealing plate 6 in the thickness direction. A thin film part 24 of the pressure valve 20 is placed and covered over this through hole 22, and protrudes from the through hole 22. For example, the pressure valve 20 is made with rubber. The pressure valve 20 may be made with a material that makes it possible to obtain a gas emission function associated with the increase of the internal pressure in the outer packaging case 4 and an explosion-proof function of bursting the thin film part 24 when the internal pressure increases suddenly. For example, rubber of the saturated system may be used for a material that is formed into the thin film part 24. The following can be listed as an example of such rubber of the saturated system: silicone rubber; butyl rubber; halogenated butyl rubber; vinyl modified butyl rubber; rubber of the ethylene propylene system; fluoro rubber; acrylic rubber and hydrogenated nitrile butadiene rubber. Cross linking agents, fillers, plasticizers, antioxidants, etc. may be properly blended with such rubber of the saturated system.

The diameter of the island 16 is longer than that of the thin film part 24. A plurality of protrusions 26 are formed on the top of this island 16. In this embodiment, four protrusions 26 are independently formed on the top of the island 16 as an example. Two of the protrusions 26 are formed in the direction of the central axis of the sealing plate 6. In the direction orthogonal to the central axis, which penetrates thorugh these protrusions 26, the other two protrusions 26 are formed. That is, the thin film part 24 of the pressure valve 20 is surrounded by a plurality of the protrusions 26, and is opened in the direction of the lateral sides of the island 16 by a clearance 28 appearing among the protrusions 26. The number of the protrusions 26 may be less than 4, and may be more than 4.

The exposed surface 12 of the sealing plate 6, which includes the islands 14 and 16 as the above, is flat. That is, the islands 14 and 16, which are formed on this flat surface, are surrounded by the curling part 10, which is like a circle.

Figure 2:
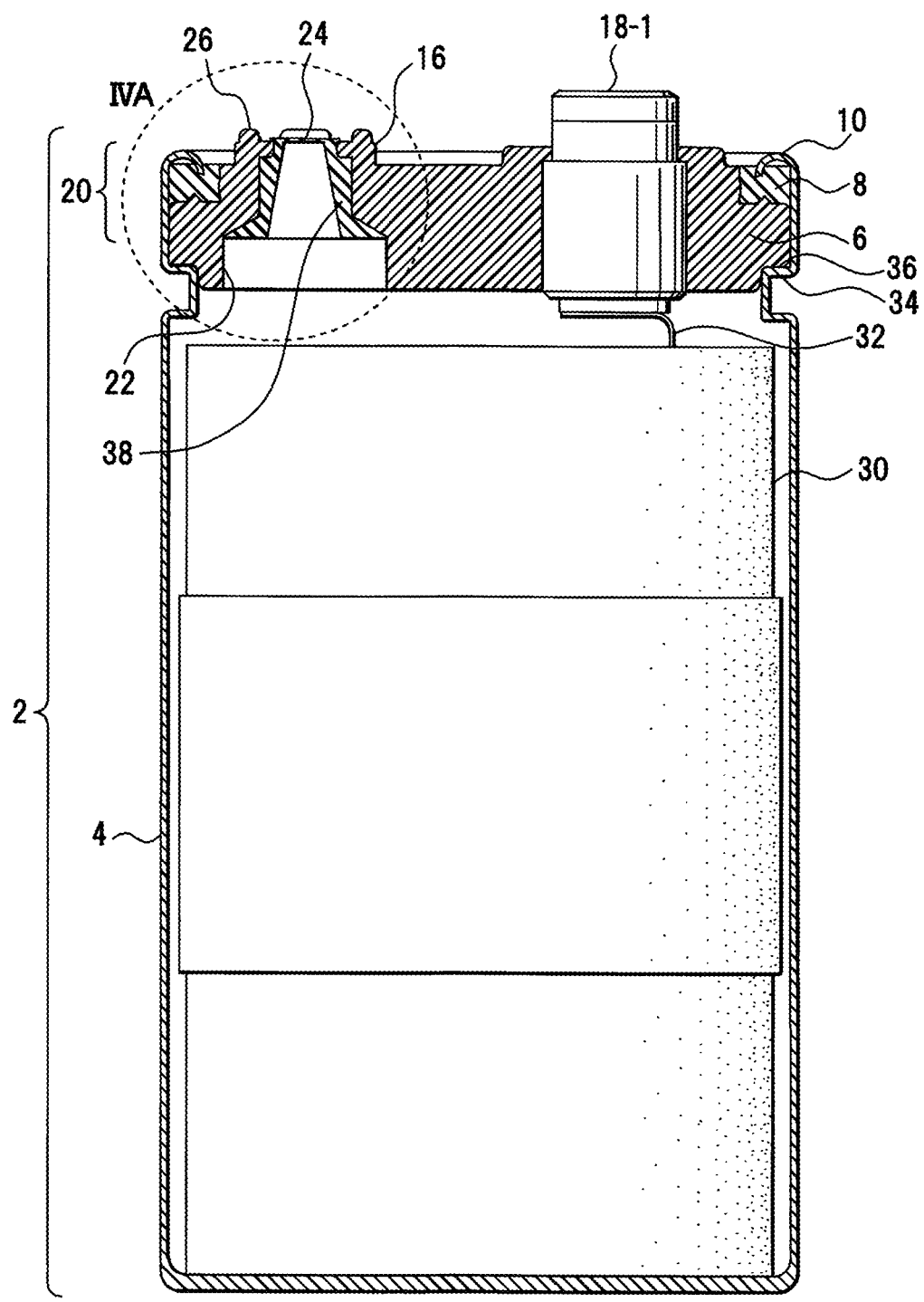
FIG. 2 is a cross-sectional view depicting a cross section taken from line II-II of FIG. 1.

FIG. 2 depicts a cross section taken from line II-II of FIG. 1. A capacitor element 30 is housed in the outer packaging case 4. This capacitor element 30 is an electric double layer capacitor element when the capacitor 2 is an electric double layer capacitor, and is an electrolytic capacitor element when the capacitor 2 is an electrolytic capacitor. As an example, when the capacitor 2 is an electric double layer capacitor, the capacitor element 30 is a columnar element body, and is a wound element which is impregnated with an electrolyte. A separator is arranged between polarized electrode bodies that are current collectors of aluminum or the like on both sides of which polarized electrode layers including activated carbon are formed, and these separator and polarized electrode layers are wound so that the above columnar element body is formed. When the capacitor 2 is an electrolytic capacitor, the capacitor element 30 is a columnar element body that is formed by a separator interposed between anode foil and cathode foil and wound, the anode foil and the cathode foil, and is a wound element which is impregnated with an electrolyte.

When the capacitor 2 is an electric double layer capacitor, an internal lead 32 that is derived from one of the polarized electrode bodies of the capacitor element 30 is connected to the anode terminal 18-1. An internal lead that is derived from the other polarized electrode body of the capacitor element 30 is connected to the cathode terminal 18-2, which is not depicted.

When the capacitor 2 is an electrolytic capacitor, the internal lead 32 that is derived from anode foil of the capacitor element 30 is connected to the anode terminal 18-1. An internal lead that is derived from cathode foil of the capacitor element 30 is connected to the cathode terminal 18-2, which is not depicted.

A step 34 that positions and fixes the sealing plate 6 is formed on the outer packaging case 4. This step 34 is formed by crimping on the outer packaging case 4. A step 36 of the sealing plate 6 is engaged with this step 34.

Figure 3:
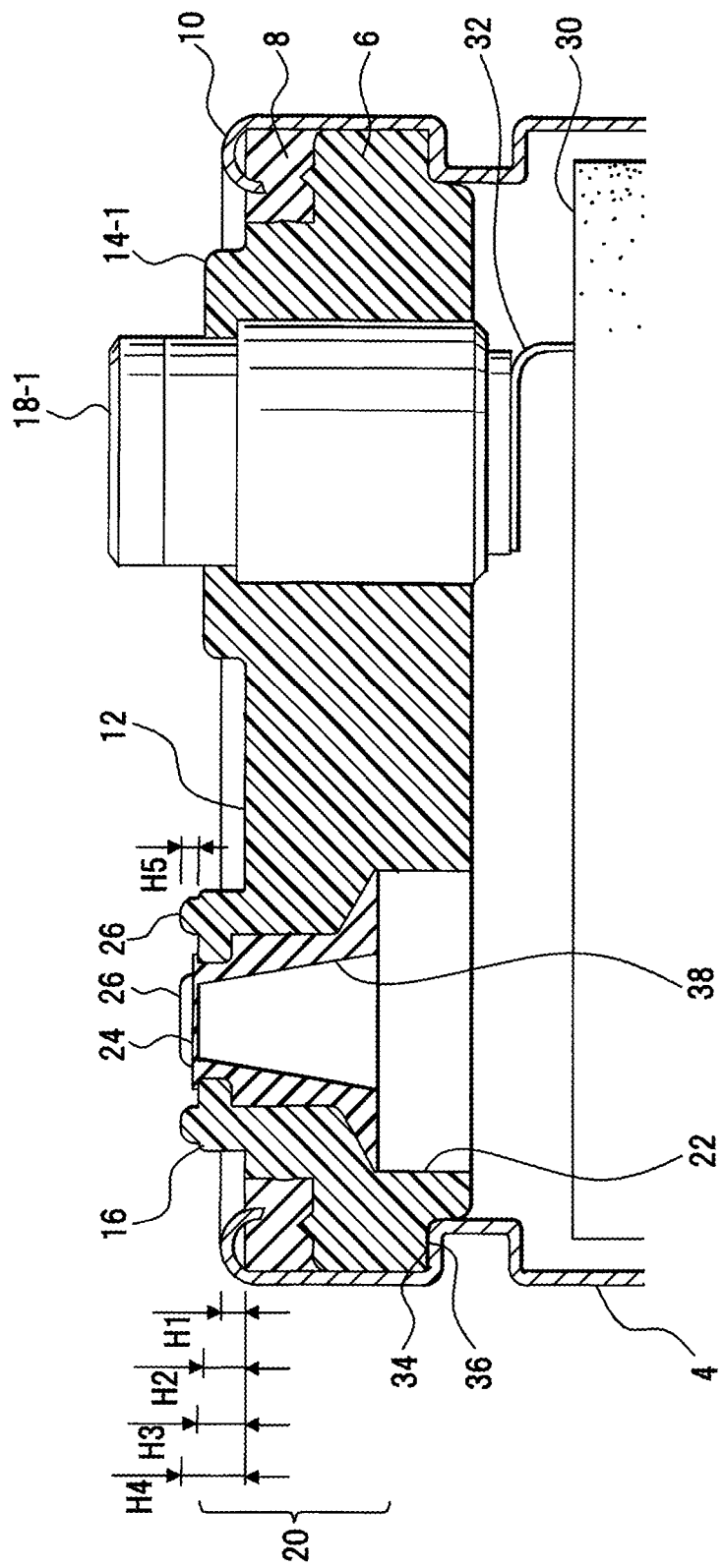
FIG. 3 is an enlarged cross-sectional view depicting a sealing plate of the capacitor depicted in FIG. 2.

FIG. 3 depicts the sealing plate 6, which is installed in the outer packaging case 4. The height of the exposed surface 12 of the sealing plate 6 is used as the basis in order for members and components concerning this sealing plate 6 to be compared in height. It is assumed that the height of the curling part 10 at the top is H1, the height of the island 14 (island 14-1) is H2, the height of the island 16 is H3, and the height of the island 16 including the protrusions 26 is H4. The correlation between their height may be H1≤H2≤H3<H4. Preferably, the correlation may be H1<H2≤H3<H4. More preferably, the correlation may be H1<H2<H3<H4. In this case, height H5 that is the height of the protrusion 26 only equals (H4−H3). That is, the position of the thin film part 24, which is a valve function part, is set higher than the curling part 10; in other words, the thin film part 24 is set further outside than the curling part 10. Thereby, the thin film part 24 protrudes from the island 16, and thus, stagnation of drops of water and dust on the surface of the thin film part 24 can be decreased.

The islands 14 (island 14-1) and 16 are integrally molded with the sealing plate 6; for example, integrally molded by molding of synthetic resin. The height H2 of this island 14 (island 14-1) may be equal to the height H1 of the curling part 10, or the island 14 may be set higher than the curling part 10. The above also applies to the island part 14-2, which is not depicted.

Figure 4A:
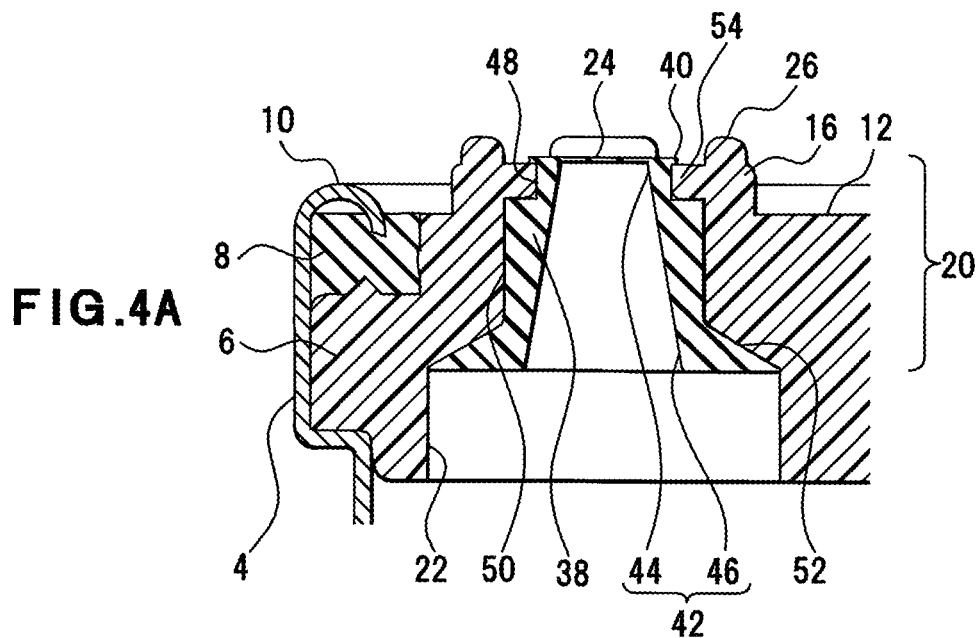
FIGS. 4A and 4B are a partially enlarged cross-sectional view of FIG. 2 and a cross-sectional view depicting a state before installation of a pressure valve.
Figure 4B:
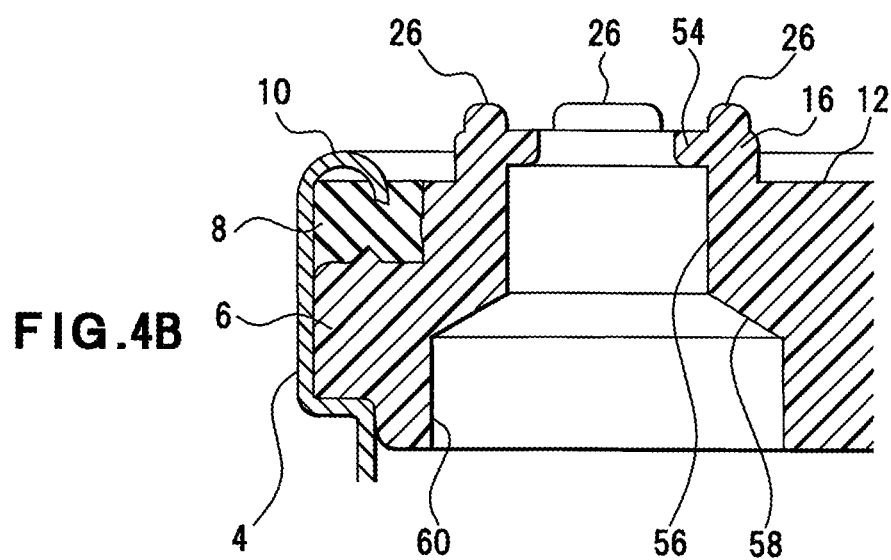

FIG. 4A depicts an enlarged cross section of the portion of IVA of FIG. 2. FIG. 4B depicts FIG. 4A with the pressure valve 20 excluded.

The pressure valve 20 is provided with the above described thin film part 24 at the top. The thin film part 24 is formed on the top of a main body 38. A flange part 40 is formed around the thin film part 24. The through hole 22 in the sealing plate 6 is occluded by the thin film part 24 and the flange part 40.

A pressure receiving hole 42 is formed in the center of this main body 38. The thin film part 24 side of this pressure receiving hole 42 is treated as a small diameter part 44. The opening side of the pressure receiving hole 42 is formed into a large diameter part 46. In the pressure receiving hole 42, the inside of the pressure valve 20 is an inclined shape so that the diameter of the pressure receiving hole 42 gets smaller as the thin film part 24 approaches. The pressure receiving hole 42 is formed into a shape of a truncated cone.

An insertion part 50 is formed around the lateral face of the main body 38 while holding a fitting concavity 48 in the side of the flange part 40. This insertion part 50 is larger than the fitting concavity 48 in diameter, and is formed larger than the flange part 40 in diameter. The back end of the insertion part 50 is formed into a stopper part 52 that has a shape of a truncated cone and the diameter of which gets larger backward. A face of the insertion part 50 of the main body 38 that is opposed to the flange part 40 also constitutes a stopper of the main body 38.

As depicted in FIG. 4B, a fitting protrusion 54 is formed on the through hole 22. This fitting protrusion 54 is put in the fitting concavity 48 of the pressure valve 20. The fitting protrusion 54 protrudes in the central direction of the through hole 22, and constitutes a portion of the smallest diameter of the through hole 22. A fitting part 56, a taper part 58 and an opening part 60 are formed in the sealing plate 6 in order from the exposed surface 12 to the back surface. The fitting part 56 constitutes an inserted part into which the insertion part 50 of the pressure valve 20 is inserted. The inside diameter of the fitting part 56 may be such a size that the pressure valve 20 can be equipped with the fitting part 56, using contractility of elasticity that the pressure valve 20 has in order for the insertion part 50 of the pressure valve 20 to be fixed. The taper part 58 is an equipped part for the stopper part 52, and is the same as or similar to the figure of the stopper part 52. The opening part 60 is an opening that is opened to the outer packaging case 4 in order to guide increase of the internal pressure in the outer packaging case 4 into the pressure receiving hole 42.

According to such a structure, the increase of the internal pressure in the outer packaging case 4 due to gas generated by the operation of the capacitor element 30 operates on the thin film part 24 from the opening part 60 via the pressure receiving hole 42. When the increase of the internal pressure is less than the capacity of the thin film part 24, the gas is gradually emitted through the thin film part 24. Thereby, the internal pressure of the outer packaging case 4 is kept at a proper pressure by the pressure valve 20.

In anomalies, gas is prominently generated from the capacitor element 30. Thereby, the internal pressure in the outer packaging case 4 extraordinarily increases. When the increase of the internal pressure, which operates on the thin film part 24, exceeds the capacity of the thin film part 24, the pressure valve 20 is opened by the burst of the thin film part 24, and gas in the outer packaging case 4 is released to the outside air. Thereby, the explosion-proof function of the capacitor 2 is fulfilled.

An example of a method for manufacturing this capacitor 2 will be explained.

This method for manufacturing the capacitor 2 includes a step of forming the island 16 and a step of installing the pressure valve 20.

(1) Step of Forming the Island 16

In this step, the sealing plate 6, which is provided with the above described island 16, is formed. The height of the island 16 is set higher than that of the curling part 10 (processed sealing part), which is formed on the outer packaging case 4.

(2) Step of Installing the Pressure Valve 20

The thin film part 24, which is a valve function part of the pressure valve 20 installed in the through hole 22 opened in the island 16 of the sealing plate 6, is set at a position higher than the curling part 10.

In such a capacitor 2 or a method for manufacturing the same, there exist the following features, functions or modifications.

(a) The pressure valve 20 is installed in the island 16 of the sealing plate 6. That is, the island 16 is higher than the curling part 10. Therefor, even if dust and moisture adhere to the thin film part 24 of the pressure valve 20 in the island 16, which protrudes higher than the curling part 10, remains thereof can be reduced. As a result, a stable valve function can be kept without any damage to the valve function from dust and moisture, and the capacitor 2, which is reliable, can be obtained.

(b) The island 16, or the thin film part 24 of the pressure valve 20 is set at a position higher than the top of the curling part 10 of the outer packaging case 4. Therefor, even if moisture adheres to and remains on the exposed surface 12 of the sealing plate 6, which is surrounded by the curling part 10, the moisture does not reach the island 16, or the thin film part 24 of the pressure valve 20. In short, moisture inside the area surrounded by the curing part 10 spills or evaporates without reaching the island 16, or the thin film part 24 of the pressure valve 20.

(c) A plurality of the protrusions 26 are provided for the top of the island 16. Thereby, the thin film part 24 of the pressure valve 20, which is arranged on the top or in the vicinity of the top of the island 16, is protected.

(d) The clearance 28 is formed among a plurality of the protrusions 26. Moisture adhering to the top of the island 16 runs down through the clearance 28, and does not remain among the protrusions 26. In short, remains of moisture in the thin film part 24 of the pressure valve 20 can be reduced, and the deterioration of the valve function can be prevented.

(e) Stagnation or adhesion of dust and moisture on or to the thin film part 24 of the pressure valve 20, which is installed in the island 16, can be reduced, the gas emission function and the explosion-proof function necessary for the pressure valve 20 are maintained, and the deterioration of the functions can be prevented.

(f) A taper face or a curved face that protrudes outside may be provided for the outer peripheral part of the island 16. Such a structure restrains stagnation or adhesion of moisture on or to the thin film part 24 of the pressure valve 20.

(g) The adhesion of rainwater and dust due to exposure to the outside air can also be restrained in the use of electrolytic capacitors, electric double layer capacitors or the like that are loaded into in-vehicle equipment, and stable gas emission and explosion-proof functions are maintained.

(h) Any space and surface in which dust and moisture are expected to remain can be removed from the sealing pate 6 by the island 16. Also, the thin film part 24 can be prevented from being submerged. Moreover, the thin film part 24 placed and covered over the island 16 is protected by the protrusions 26, and can be protected from the occurrence of damage upon transfer or the like.

Figure 5A:
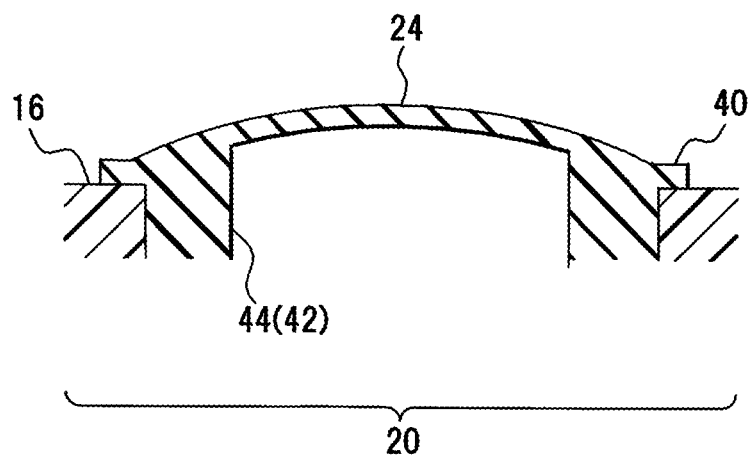
FIGS. 5A to 5C are cross-sectional views depicting variations of a valve function part.
Figure 5B:
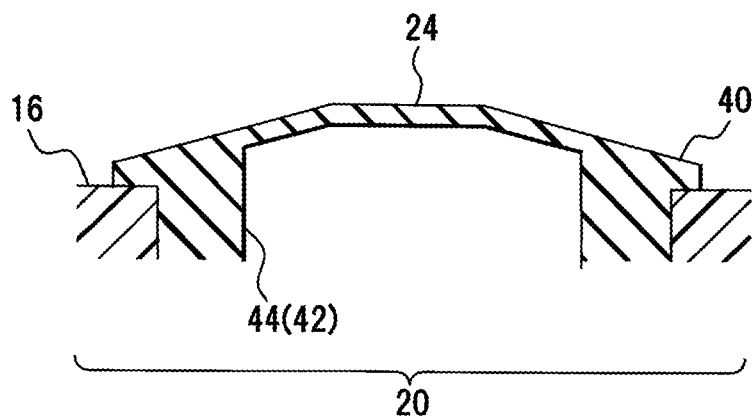
Figure 5C:
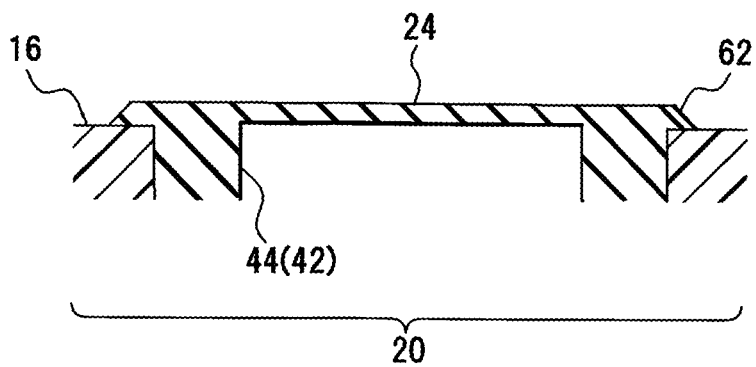

Other Embodiments (1) While being a shape of a flat face in the above embodiment, the thin film part 24 of the pressure valve 20 may have a curved shape of descending to the periphery in its cross section as depicted in FIG. 5A. The thin film part 24 may be a form of bulging outside with the increase of the internal pressure, though. As depicted in FIG. 5B, the thin film part 24 may have a taper shape of descending to the periphery. The peripheral edge part of the flange part 40 may be formed into a taper face 62 as depicted in FIG. 5C. Such structures can hold down dust and moisture adhering to the thin film part 24.

(2) It is illustrated in the above embodiment that the pressure valve 20 is installed in the sealing plate 6. The present invention is not limited to this. A sealing member may be other than the sealing plate 6 but part of an outer packaging member in which a capacitor element is enclosed.

Figure 6A:
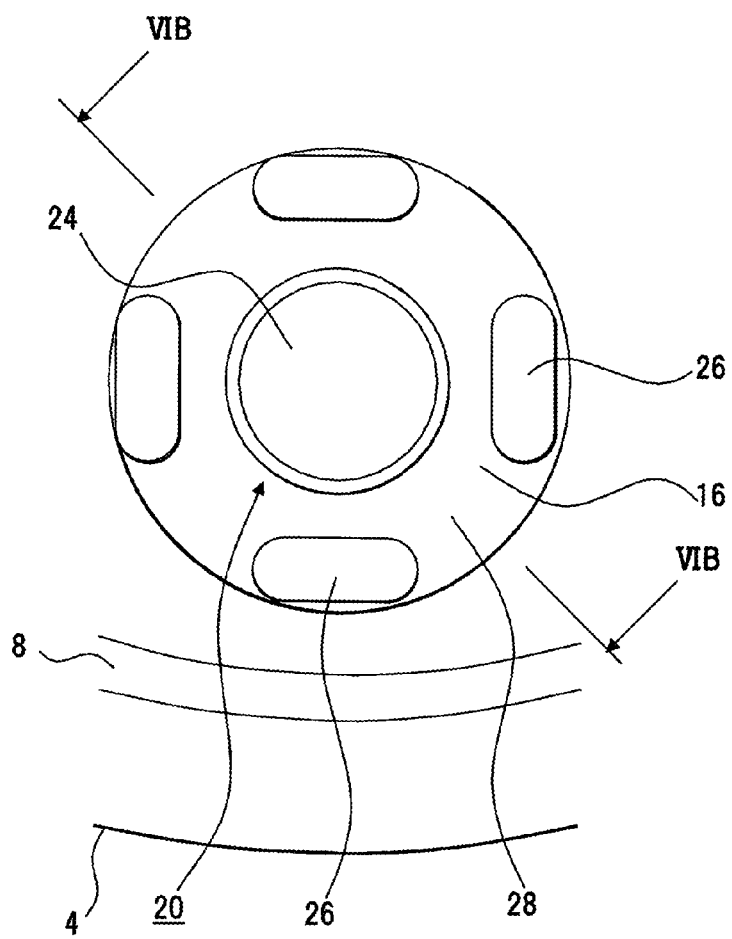
FIGS. 6A and 6B depict a variation of an island part.
Figure 6B:
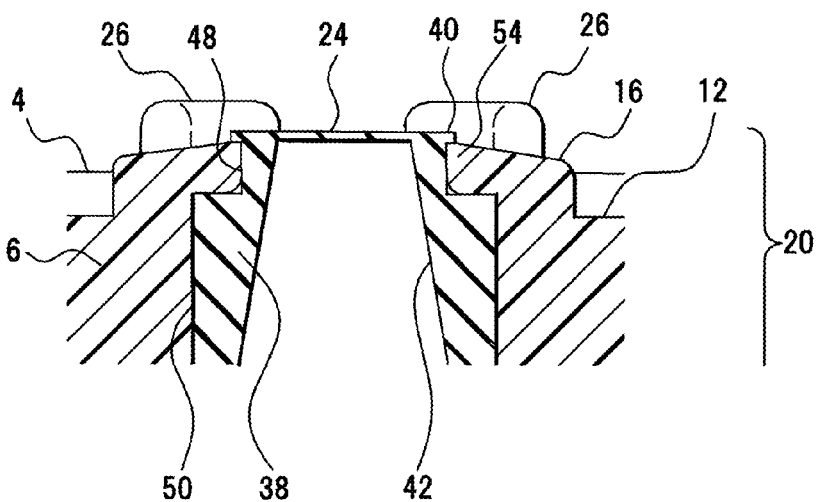

(3) While having a shape of a flat face in the above embodiment, the island 16 may have an inclined face that inclines downward toward the outer edge as depicted in FIG. 6B, which depicts the cross section taken from line VIB-VIB of FIG. 6A. This inclined face may be a face that inclines downward, and may be either a taper face or a curved face. According to such a structure, drops of water flow toward the outer edge and easily spill from the island 16, and dust moves toward the outer edge and easily drops from the island 16. A function of reducing stagnation of drops of water and dust can be improved.

The following are appended to the above described embodiments:

(1) According to an aspect of the embodiments, a capacitor includes a sealing member that includes a valve installation part, the valve installation part being higher than a processed sealing part of an outer packaging case for housing a capacitor element; and a pressure valve that is installed in a through hole of the valve installation part and whose valve function part is set at a position, the position being higher than the processed sealing part.

(2) Preferably, the capacitor may further include at least one protrusion that is formed on a top of the valve installation part and that surrounds the valve function part.

(3) In the capacitor, preferably, the sealing member may include a terminal installation part that is set higher than a position of the processed sealing part, and the valve installation part may be higher than the terminal installation part.

(4) In the capacitor, preferably, a curved face that protrudes outside or a taper face may be provided for an outer peripheral part of the valve function part.

(5) In the capacitor, preferably, the valve installation part may include an inclined face that inclines toward an outer edge.

(6) According to an aspect of the embodiments, a method for manufacturing a capacitor includes forming a valve installation part that is higher than a processed sealing part of an outer packaging case for housing a capacitor element, the processed sealing part sealing the outer packaging case; and setting a valve function part of a pressure valve that is installed in a through hole opened in the valve installation part at a position, the position being higher than the processed sealing part.

According to aspects of the capacitor of these embodiments, or the method for manufacturing the same, the following effects can be obtained.

(1) Because a valve function part of a pressure valve is arranged further outside than a processed sealing part of an outer packaging case, stagnation of water and dust in the valve function part are restrained, the deterioration of a valve unction because of water and dust can be prevented, and a stable valve function can be kept.

(2) A capacitor of high reliability can be offered by upkeep of a valve function.

While the most preferred embodiments of the present invention have been described as the above, the present invention is not limited to the above descriptions, and it is a matter of course that various variations and modifications can be made by those skilled in the art based on the spirit of the invention recited in Claims or disclosed in Embodiments for Carrying out Invention, and needless to say, such variations and modifications are also encompassed in the scope of the present invention.

In the capacitor of the present invention and the method for manufacturing the same, a pressure valve or its valve function part is arranged at a position higher than a processed sealing part of an outer packaging case. Thus, the adhesion of dust and moisture is held down, a stable valve function can be kept, etc., and therefor, the present invention is useful.

What is claimed is:

1. A capacitor comprising:
   a sealing member that includes a valve installation part, the valve installation part being higher than a processed sealing part of an outer packaging case for housing a capacitor element;
   a pressure valve that is installed in a through hole of the valve installation part and whose valve function part is set at a position, the position being higher than the processed sealing part; and
   protrusions that are formed on a top of the valve installation part, the protrusions surrounding the valve function part, a clearance among the protrusions being formed, wherein
   a curved face that protrudes outside or a taper face is provided for an outer peripheral part of the valve function part.

2. The capacitor of claim 1, wherein
   the sealing member includes a terminal installation part that is set higher than a position of the processed sealing part, and the valve installation part is higher than the terminal installation part.

3. The capacitor of claim 1, wherein
   the valve installation part includes an inclined face that inclines toward an outer edge.

* * * * *